No. 728,584. PATENTED MAY 19, 1903.
W. K-L. DICKSON.
CAMERA.
APPLICATION FILED JAN. 13, 1903.
NO MODEL. 5 SHEETS—SHEET 1.

WITNESSES:

INVENTOR:
William K-L. Dickson
BY
Edmond Conger Brown
ATTORNEY.

No. 728,584. PATENTED MAY 19, 1903.
W. K-L. DICKSON.
CAMERA.
APPLICATION FILED JAN. 13, 1903.
NO MODEL. 5 SHEETS—SHEET 3.

WITNESSES:
INVENTOR:
William K-L. Dickson
BY
Edmond Conger Brown
ATTORNEY

No. 728,584. Patented May 19, 1903.

UNITED STATES PATENT OFFICE.

WILLIAM KENNEDY-LAURIE DICKSON, OF LONDON, ENGLAND.

CAMERA.

SPECIFICATION forming part of Letters Patent No. 728,584, dated May 19, 1903.

Application filed January 13, 1903. Serial No. 138,839. (No model.)

*To all whom it may concern:*

Be it known that I, WILLIAM KENNEDY-LAURIE DICKSON, a subject of the King of Great Britain and Ireland, and a resident of London, England, have invented certain new and useful Improvements in Cameras, of which the following is a specification.

My invention relates to photographic cameras, and particularly to those classes of such devices called "panoramic" cameras and "stereoscopic" cameras, the invention being adapted to a variety of uses, being capable of taking either a pair of stereoscopic panoramic pictures, a pair of stereoscopic pictures not panoramic, a single or not stereoscopic panoramic picture, or a single not panoramic picture.

The invention consists of the novel construction, arrangement, and combination of various devices and parts, as hereinafter and in the accompanying drawings fully and at large set forth.

Figure 1:
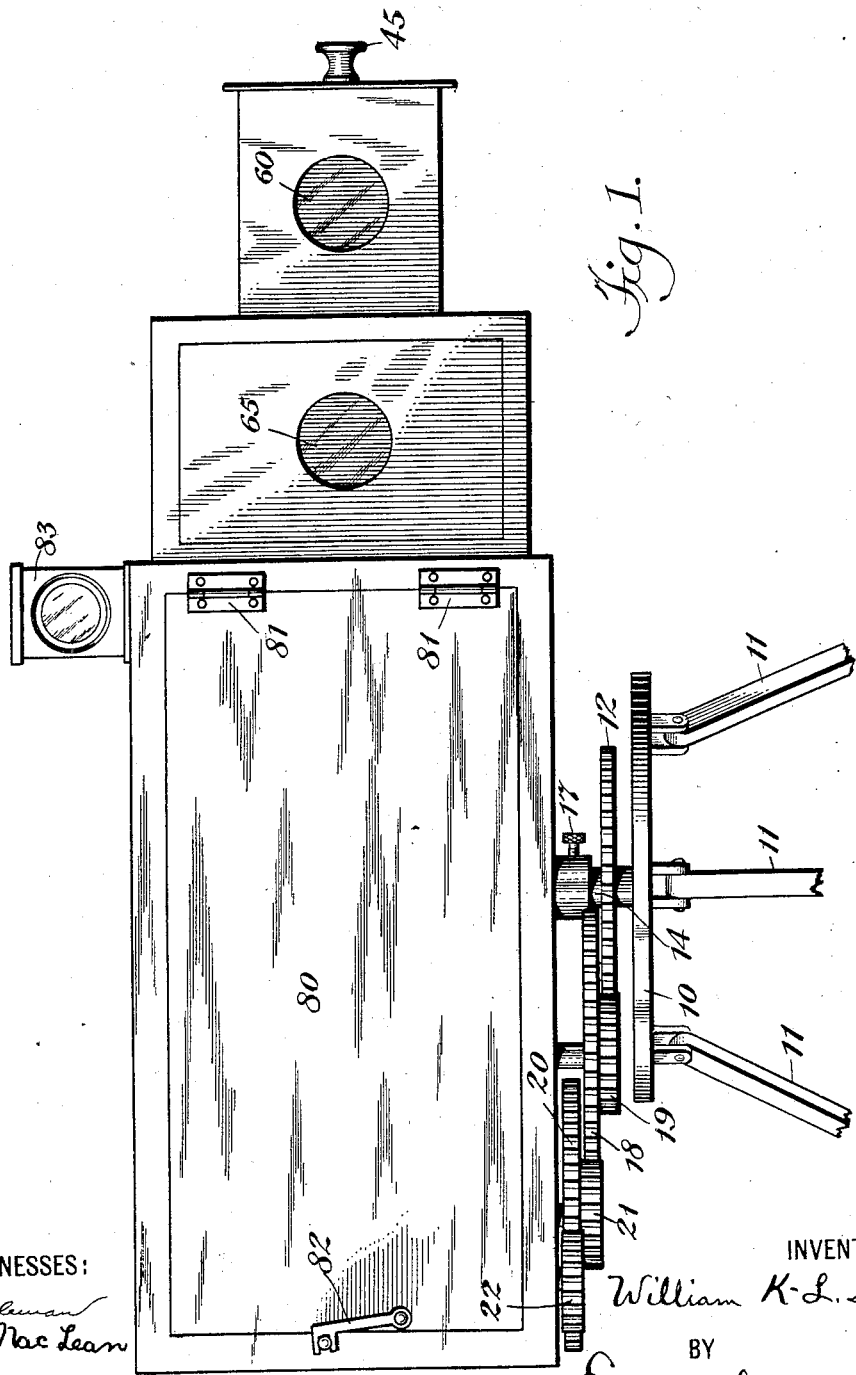
Figure 2:
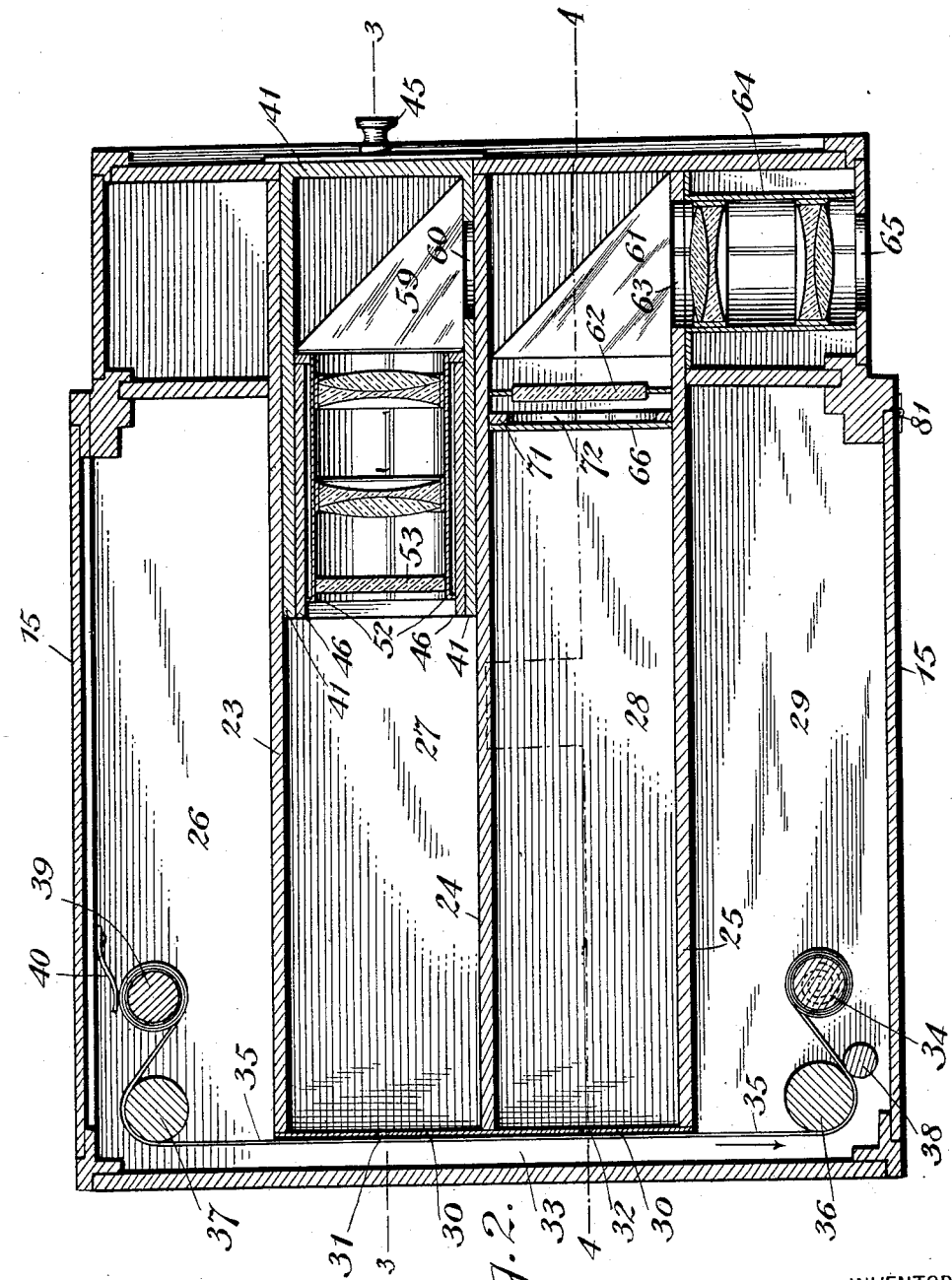
Figure 3:
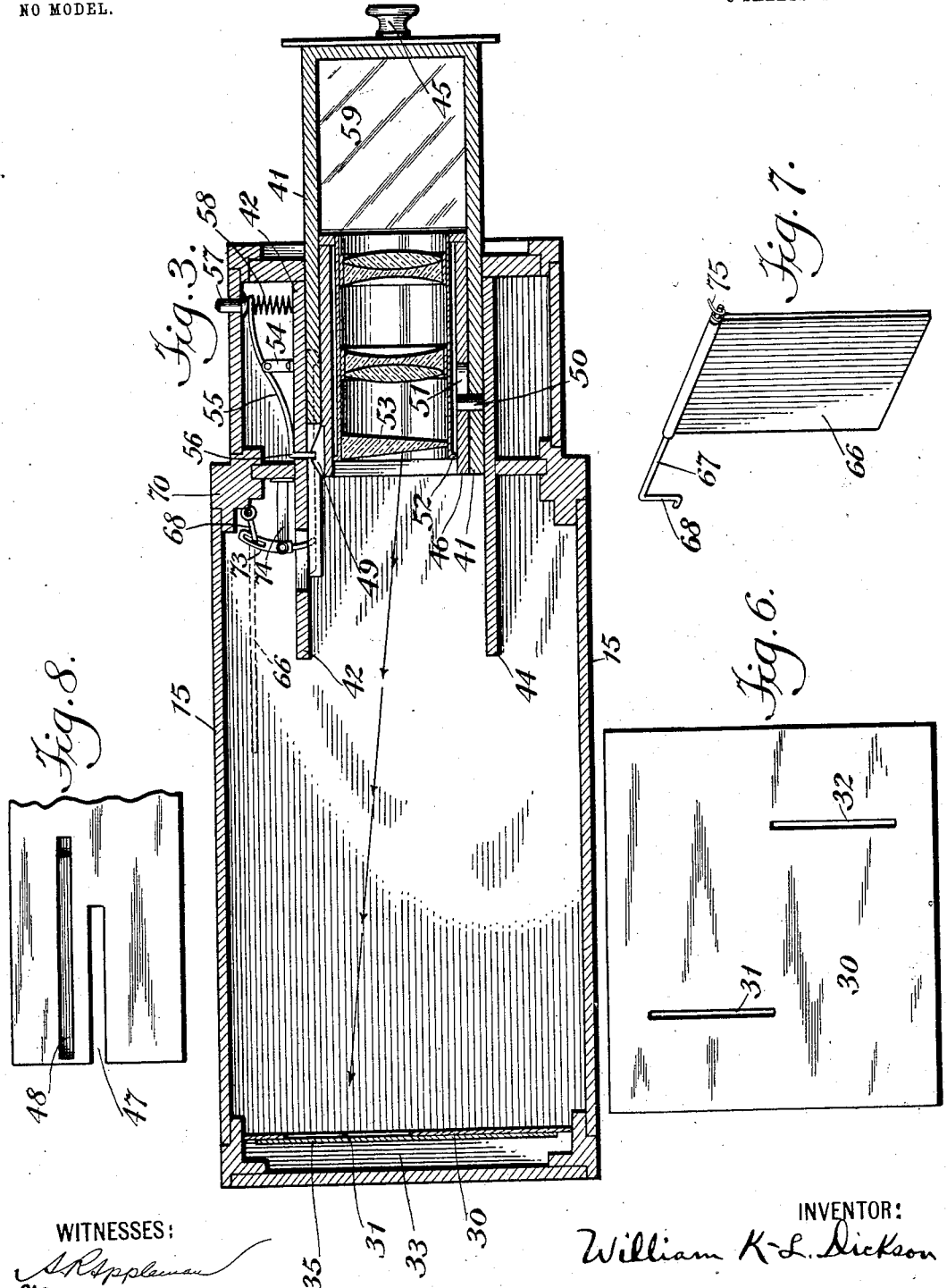
Figure 4:
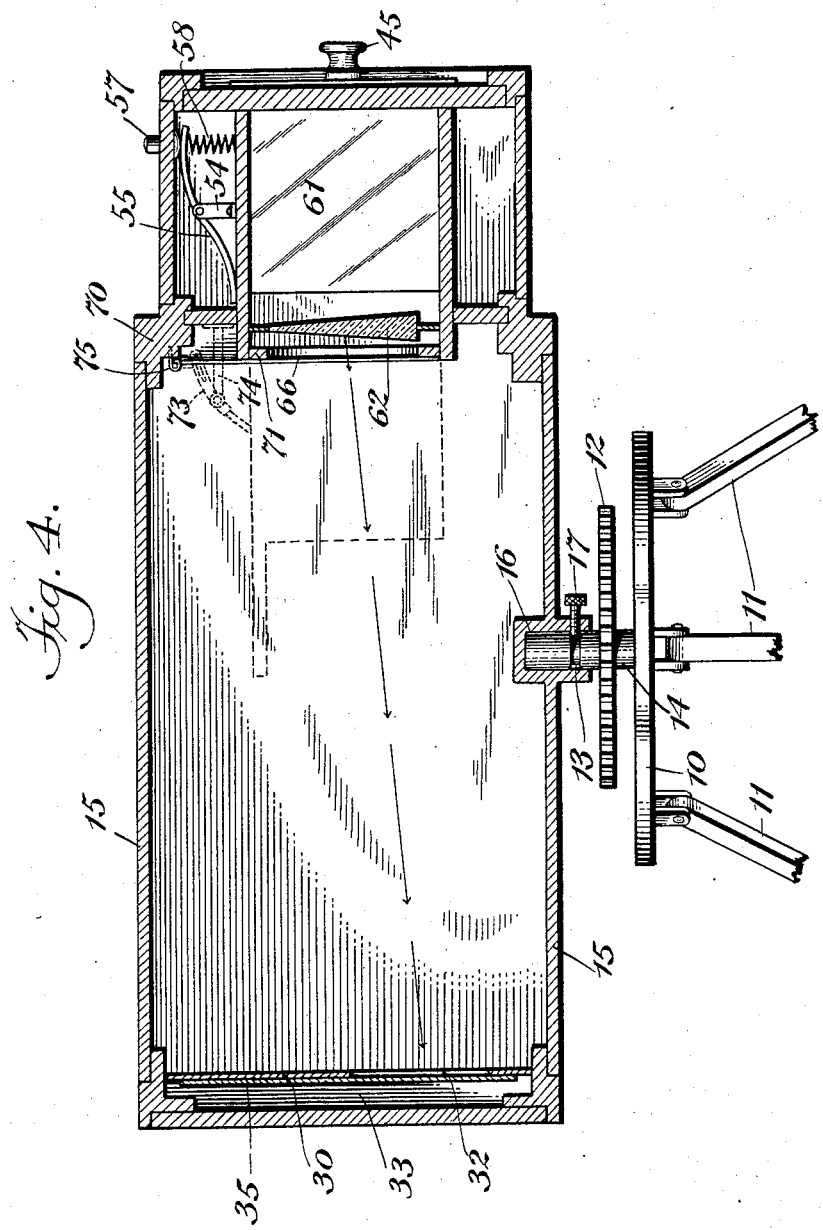
Figure 5:
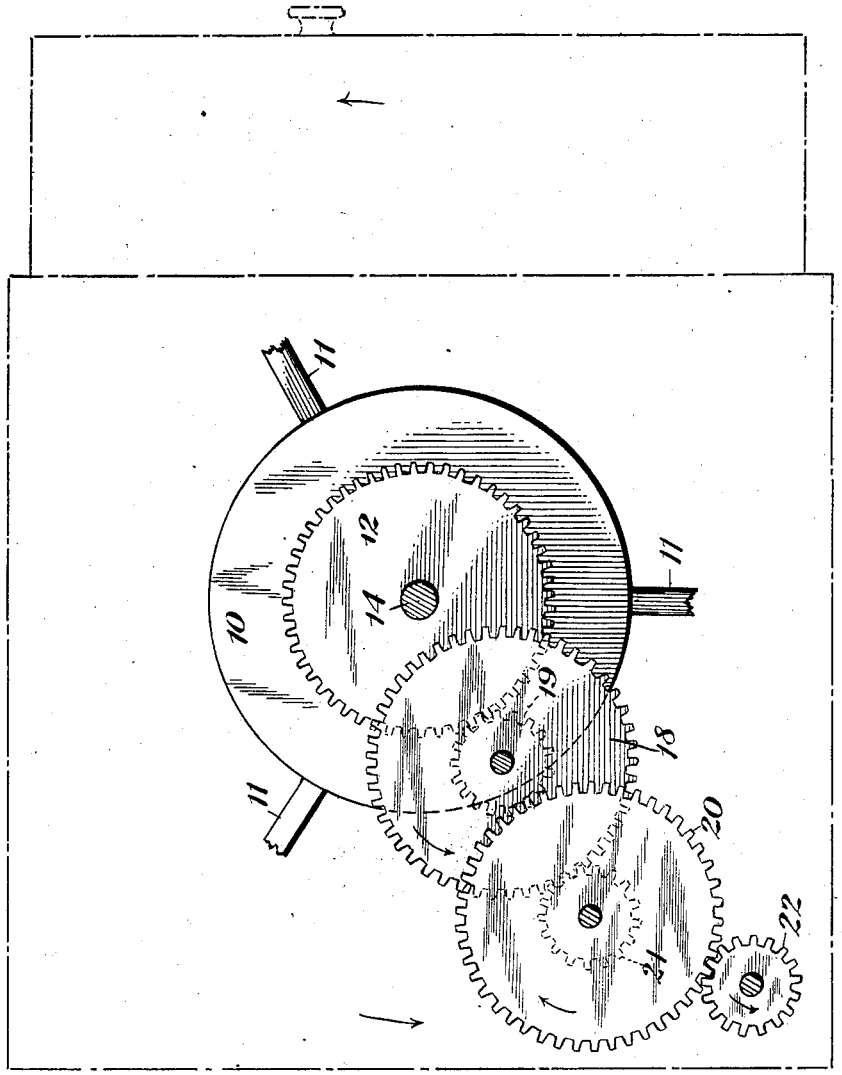

In the accompanying drawings, Figure 1 is a side elevation of a camera constructed according to my invention, showing the "draw," hereinafter so called and fully explained, extended. Fig. 2 is a horizontal section along a line approximately midway between the top and bottom of the camera, but showing said draw closed. Fig. 3 is a vertical section along the line 3 3 of Fig. 2. Fig. 4 is a vertical section along the line 4 4 of Fig. 2. Fig. 5 is a plan view of the gearing which regulates the feeding of the film when the camera is revolved. Fig. 6 is a view of the screen, which is placed at the back of the camera directly in front of the film when a panoramic view is being taken. Fig. 7 is the shutter for one of the lenses; and Fig. 8 shows a part of the means whereby said shutter is operated, all as hereinafter particularly described.

In carrying my invention into effect I provide a stationary base or rest upon which the camera may be revolved, which base or rest may be, as shown in Figs. 1 and 4, the top of an ordinary camera-tripod. In said figures, 10 represents the said camera-base or tripod-top, and 11 the legs of the tripod. Rigidly attached to the base is a gear-wheel 12, having an upwardly-extending shaft or stud 14, which forms the pivot upon which the camera revolves. The stud 14 is provided with a groove 13, as shown in Fig. 4.

Pivotally supported on the stud 14 is the camera body or case 15, the bottom of which is provided with a socket 16, into which the stud 14 passes and through the side of which extends the screw 17, the point of which enters the groove 13, (see Fig. 4,) thus revolubly securing the camera to the base.

On the bottom of the camera are the gear-wheels 18 and 19, 20 and 21, and 22. The wheels 18 and 19 are rigidly secured together, and so likewise are the wheels 20 and 21. The wheel 22 is rigidly secured to the bottom of a roller 36, over which the film passes, as will be hereinafter fully described. The location and relative positions of all of said wheels are particularly shown in Figs. 1 and 5, and their operation in detail will be hereinafter explained.

Referring now more particularly to Fig. 2, it will be seen that the camera proper is provided with three vertical walls or partitions 23, 24, and 25, extending longitudinally from the front of the camera nearly through to the back and dividing the camera into four compartments, (designated, respectively, 26, 27, 28, and 29.) At the back of the partitions 23, 24, and 25 is a screen 30, closing in the compartments 27 and 28. This screen has two vertical slits, (see Fig. 6,) one, 31, being in the upper left-hand quarter (looking toward the front of the camera) and the other, 32, in the lower right-hand quarter. Behind the screen 30 is a compartment or passage 33, which communicates with the two compartments 26 and 29. In the compartment 29 is a winding-reel 34, operated by a spring, so as to be adapted to wind up the film 35, which passes over the rollers 36 and 37. The roller 36 is operated by the gear-wheel 22, as heretofore stated, and a friction-roller 38 is provided, which presses the film closely against the roller 36, so that when said roller 36 is revolved by the gearing the film is fed forward and allowed to wind up on the spring-roller 34. The roller from which the film is unwound is located in the compartment 26 and is designated 39. A friction-spring 40 is provided, attached to the wall of the camera and pressing upon the unwinding-roller 39, so as to retard the revolution thereof, which results in keeping the film always taut behind the screen 30 when the camera is revolved on its pivot. In the forward part of the compartment 27 is located a sliding telescopic box or draw, which carries the optical part of the camera appertaining to the said compartment. This draw is shown particularly in Figs. 2 and 3, being closed in the former and extended in the latter figure. It comprises two telescoping parts, the outer of which (designated 41 in the drawings) fits closely between the partitions 23 and 24 on each side and the upper guide 42 and the lower guide 44 on the top and bottom, respectively, and it is provided with a knob 45 for convenience in extending the same. The inner telescoping part 46 is located inside of the rear end of the part 41. The top of the part 41 is longer and extends farther backward into the body of the camera and is provided with a slot 47 and a groove 48. (Best shown in Fig. 8.) The inner draw 46 is provided at the inner end of its top with a projection 49, which enters the slot 47, as shown in Fig. 3, and which has a socket in its upper part. The bottom of the draw 41 is provided with a stud 50, which slides in a groove 51 in the bottom of the inner draw 46. The said inner draw contains the lens-tube 52, which contains in addition to the usual photographic objective a prism 53, adapted to deflect the light passing therethrough upward and cause it to fall upon the upper part of the film. (See Fig. 3.) On the upper guide 42 is an upwardly-projecting support 54, to which is pivotally secured the lever 55, which is provided at its inner end with a toe 56, adapted to enter the socket in the projection 49 of the draw 46. The outer end of the said lever is provided with a push-button 57 for depressing the same to raise the toe out of said socket, and a spring 58 tends always to hold the said outer end elevated. In the forward part of the draw 41 is located the diagonal reflecting-prism 59, and directly adjacent to said prism, in the side of the draw, is a light-opening 60. In the forward part of the compartment 28 is located another diagonal reflecting-prism 61, and behind same is a prism 62, adapted to deflect the light passing therethrough downward and cause it to fall on the lower part of the film. (See Fig. 4.) Behind said prism is a partition 71, having an opening 72. Adjacent to said diagonal prism 61 is a light-opening 63, and outside of that, in the forward part of the compartment 29, is a lens-tube 64, provided with the usual photographic objective. A light-opening 65 is provided in front of said objective.

When the draw 41 is closed in the position shown in Fig. 2, no light can enter; but in order to prevent the entry of light into the compartment 28 a shutter is provided adapted to be opened when the draw is extended. This shutter is shown in perspective in Fig. 7. It consists of a flap 66, rigidly attached to a rod 67, having a crank-arm 68. The shutter is pivotally hung directly behind the partition 71 on the cross-piece 70, (see Fig. 4,) and the arm 68 extends across into the compartment 27, (see Fig. 3,) where its end engages with the slotted upper end of a lever 73, which is pivotally attached to the bracket 74. The lower end of said lever extends downward into the opening 43 and lies in the groove 48 in the top of the outer draw. When the lever 73 is in the position shown in Fig. 3, the shutter is elevated or open, as shown in the dotted lines; but when the lever is in the position shown in Fig. 4 the shutter is closed, as shown in said figure. A spring 75 is provided by means of which the shutter is maintained in an open or raised position whenever the position of the draw 41 and the lever 73 will permit.

One side of the camera-case may be provided with hinges, so as to be opened when desired and permit access to the interior. In Fig. 1 the side or door 80 is shown provided with hinges 81 and a securing-latch 82. A suitable finder, as 83, may be provided, if desired.

I have not shown or described any external light-excluding caps, shutters, or similar devices, as same are not usually necessary in my camera. When the camera is not in use, the draws are closed in, and consequently no light can enter. When the draws are extended, light can, it is true, enter; but the film is entirely protected by the screen 30, with the exception of the small portions behind the slits 30 and 31. These small portions are of course overexposed and spoiled; but when the camera is revolved fresh portions of film are brought into the field, upon which as they pass behind the slits the negative is taken.

The operation of my invention is as follows: When it is desired to take a stereoscopic panoramic view, the camera is properly adjusted and directed by means of the finder or otherwise, while the lens-draw remains closed. The longitudinal axis of the camera will of course not be directed at the center of the field, as in the ordinary camera, but will instead be directed on a line at an angle of ninety degrees thereto. In other words, the optical axis of the objective in the front part of the compartment 29 will be directed at or rather a little to one side of the point at which the panoramic view is to begin. The lens-draw 41 is then extended by means of the knob 45, carrying out with it the inner telescoping draw 46. This extension continues until the socket in the projection 49 comes under the toe of the lever 55, which stops and holds the said inner draw, the movement of the outer draw continuing, if desired, until the stud 50 reaches the outer end of the slot 51. The inner draw 46, which carries the lenses, is always stopped by the lever 55 at exactly the proper focal distance from the film; but the outer draw, which carries the diagonal reflecting-prism 59, is left free to move in and out within certain limits in order that the difference in the point of view of the two stereoscopic objectives may be varied to some extent, and thus the stereoscopic effect in the picture increased or diminished, as may be desired. The extension of the draw, as above described, of course uncovers the light-opening 60 and at the same time the shutter 66 is raised by the action of the spring 75 as soon as the lower end of the lever 73 is released from being upheld by the draw 41 and allowed to fall. The draw now being opened and the shutter being simultaneously raised, light enters through both objectives. The light which passes into the opening 65 passes through the lens immediately behind, then through the reflecting-prism 61, and then through the inner prism 62, being thereby deflected downward and passes through the slit 32 to the film 35. The light which passes through the opening 60 is reflected by the prism 59, passes through the adjacent objective, and then through the prism 53, by means of which it is deflected upward, so as to pass through the slit 31 to the film 35.

As long as the camera remains stationary the portions of the film behind the slits are overexposed and useless as negative, the available picture beginning only when the camera begins to revolve and the film to move. This is the reason why it is necessary, as said above, to direct the camera at a point a little to one side of where the view is to begin. Upon revolving the camera, which revolution must be by sweeping the lenses around to the left, as indicated by the arrows at the right and left of Fig. 5, the gear-wheels 18 to 22, inclusive, are rotated, as indicated by the arrows thereon, respectively, and thereby the film-roller 36 revolved and the film allowed to wind up on the reel 34. It will be noticed that the direction of the motion of the film is the same as that of the rear of the camera. In panoramic cameras as usually constructed it is evident that the motion of the film as it is wound up must be in the reverse direction to that of the rear of the camera. In other words, the part of the film upon which the light is at any moment falling must always be stationary with respect to the view being photographed, so that the slit shall pass over the stationary film just as the lens sweeps over the stationary external field of view; but it will be evident that in my invention as the light is reflected before falling upon the film the apparent motion of external objects with regard to the camera will be reversed and that consequently the motion of the film in such a camera must be reversed, and instead of moving backward as regards the slit in the rear screen of the camera, so that the exposed film is stationary as regards external objects, it must move in the same direction as the slit in the camera-screen, but faster, so as to overtake and pass by the said slit.

If it is desired to take a single or not stereoscopic panoramic view, the draw 41 may be extended so as to raise the shutter 66, the light-opening 60 may be obstructed or closed, and the camera revolved as before.

To take an ordinary or non-panoramic view, either stereoscopic or not, it is only necessary to limit the extent of the revolution of the camera to the proper degree, or, if desired, the screen 30 may be made removable and suitable capping devices or shutters provided.

The principal advantages of a camera constructed according to my invention are obvious, such as its extreme compactness, lightness, and adaptability to several different applications. One very important advantage, however, is not so obvious, and I wish to call particular attention to the same. It is well understood that a pair of pictures taken with an ordinary stereoscopic camera must be cut apart and transposed before mounting on the card. With pictures taken by my camera this is unnecessary. It will be understood that the reflection of the pencils of light by which the twin images are produced results in a crossing of the rays of each of said pencils, and consequently in the reversal in the negative of the relations of right and left of the image from those relations which would exist in a negative made by an ordinary camera. If then the positives be printed with the emulsion side of the negative turned away from the sensitive side of the positive paper or the negative films be reversed, the sensitive side being outward, which will allow ordinary printing to be effected, emulsion to emulsion, then on account of the reversal which takes place in the reflecting-prisms the prints will have the correct relation to right and left in each image as well as the correct relation of the two images.

A stereoscope for viewing pictures taken with my camera must include besides the usual prismatic lenses an additional pair of prisms adapted to reduce the upper and lower pictures to the same apparent horizontal plane, or the same effect can be produced by a single pair of sufficiently-strong prismatic lenses set at an angle of forty-five degrees to the usual position, so that the right-hand lens shall (apparently) deflect the upper picture downward and to the left and the left-hand lens deflect its picture upward and to the right, thus merging identical portions of the two pictures.

Having thus described my invention, what I claim as new, and desire to secure by Letters Patent, is as follows:

1. In a stereoscopic camera, the combination with the partitioned box or casing, carrying a sensitive plate or film, and provided with an objective the optical axis of which is not perpendicular to the surface of the plate or film, and provided with a reflecting device adapted to reflect the light passing through said objective upon said plate or film;

of a draw adapted to slide into the camera when not in use and to be extended therefrom when desired, said draw carrying an objective the optical axis of which is perpendicular to the plate or film and a reflecting device in front of said objective adapted to reflect light upon and through said objective.

2. In a stereoscopic camera, the combination with the partitioned box or casing, carrying a sensitive plate or film, and provided with an objective the optical axis of which is not perpendicular to the surface of the plate or film, and provided with a reflecting device adapted to reflect the light passing through said objective upon said plate or film; of a telescopic draw adapted to slide into the camera when not in use, the inner part of said draw carrying an objective the optical axis of which is perpendicular to the plate or film and the outer part of said draw carrying a reflecting device adapted to reflect light upon and through said objective, means adapted to hold the objective in said inner draw at its proper focal length from the plate or film when extended, and means adapted to permit the relation of said reflecting device in said outer draw, when extended, to said objective, to be varied without moving said objective.

3. In a stereoscopic camera, the combination with the partitioned box or casing, carrying a sensitive plate or film, and provided with an objective the optical axis of which is not perpendicular to the surface of the plate or film, and provided with a reflecting device adapted to reflect the light passing through said objective upon said plate or film; of a telescopic draw adapted to slide into the camera when not in use, comprising two parts, one of which is provided with a slot and the other with a stud adapted to enter said slot, the inner part of said draw carrying an objective the optical axis of which is perpendicular to the plate or film and the outer part of said draw carrying a reflecting device adapted to reflect light upon and through said objective, and means adapted to hold the objective in said inner draw at its proper focal length from the plate or film when extended, comprising a stop device on the camera-body adapted to engage with said inner draw, the said outer draw and reflecting device thereby carried being free to move within certain limits independent of said inner draw.

4. In a panoramic camera, the combination with the box or casing, carrying a sensitive film, a roller adapted to wind up said film, a roller adapted to unwind said film, a screen provided with a slit in front of said film, an objective the optical axis of which is not perpendicular to the surface of the film, and a reflecting device adapted to reflect light upon said film; of a stationary base, and devices adapted to feed said film past said slit when the camera is revolved on said base; the motion of the film being in the same direction as that of the slit but at a greater speed.

5. In a panoramic camera, the combination with the box or casing, carrying a sensitive film, a roller adapted to wind up said film, a roller adapted to unwind said film, a screen provided with a slit in front of said film, an objective the optical axis of which is not perpendicular to the surface of the film, and a reflecting device adapted to reflect light upon said film; of a stationary base upon which the camera is pivotally secured, a gear-wheel rigidly attached to said base, and gearing on the bottom of said camera adapted to revolve said winding-up reel and thus feed said film past said slit when the camera is revolved on said base; the motion of the film being in the same direction as that of the slit but at a greater speed.

6. In a stereoscopic panoramic camera, the combination with the box or casing provided with a sensitive film and a winding and unwinding reel therefor, and with two objectives, one of which has its optical axis not perpendicular to the surface of the film and is provided with a reflecting device behind it adapted to reflect the light passing through it upon the film, and the other of said objectives having its optical axis perpendicular to the surface of the film and having a reflecting device in front of it adapted to reflect light into and through said objective and upon said film; a telescopic draw bearing said last-named objective and reflecting device, adapted to slide into the camera and to be extended therefrom; a prismatic lens in the path of the light from one of said objectives adapted to deflect said light upward, and a prismatic lens in the path of the light from the other of said objectives adapted to deflect said light downward; a longitudinal vertical partition in the middle of the camera, a screen at the rear end of said partition and in front of said film, having an adjustable vertical slit in the upper part of the portion corresponding to the upwardly-deflecting prism and a vertical slit in the lower part of the portion corresponding to the downwardly-deflecting prism; of a stationary base upon which the camera is pivotally secured, a gear-wheel rigidly attached to said base, and gearing on the bottom of said camera adapted to revolve said winding-up reel and thus feed said film past said slits when the camera is revolved on said base; the motion of the film being in the same direction as that of the slits but at a greater speed.

7. In a stereoscopic camera, the combination with the partitioned box or casing, carrying a sensitive plate or film, and provided with an objective the optical axis of which is not perpendicular to the surface of the plate or film, and provided with a reflecting device adapted to reflect the light passing through said objective upon said plate or film; of a telescopic draw adapted to slide into the camera when not in use, the inner part of said draw carrying an objective the optical axis of which is perpendicular to the plate or film and the outer part of said draw carrying a reflecting device adapted to reflect light upon and through said objective, means adapted to hold the objective in said inner draw at its proper focal length from the plate or film when extended, and means adapted to permit the relation of said reflecting device in said outer draw, when extended, to said objective, to be varied without moving said objective; and a shutter adapted to prevent the passage of light through the stationary objective, and means for operating said shutter so that same shall be closed when said draw is closed and open when said draw is extended.

8. In a stereoscopic camera, the combination with the partitioned box or casing, carrying a sensitive plate or film, and provided with an objective the optical axis of which is not perpendicular to the surface of the plate or film, and provided with a reflecting device adapted to reflect the light passing through said objective upon said plate or film; of a telescopic draw adapted to slide into the camera when not in use, the inner part of said draw carrying an objective the optical axis of which is perpendicular to the plate or film and the outer part of said draw carrying a reflecting device adapted to reflect light upon and through said objective, means adapted to hold the objective in said inner draw at its proper focal length from the plate or film when extended, and means adapted to permit the relation of said reflecting device in said outer draw, when extended, to said objective, to be varied without moving said objective; and a shutter adapted to prevent the passage of light through the stationary objective, and means for operating said shutter so that same shall be closed when said draw is closed and open when said draw is extended, said means comprising an arm on said shutter adapted to engage with a lever operated by the end of the draw when the same is closed and thereby close the shutter, and a spring adapted to open said shutter when the draw is extended and the said lever and arm released.

In witness whereof I have hereunto signed my name, this 31st day of December, 1902, in the presence of two subscribing witnesses.

WILLIAM KENNEDY-LAURIE DICKSON.

Witnesses:
    H. D. JAMESON,
    A. NUTTING.